United States Patent
Zhao et al.

(10) Patent No.: US 10,023,802 B2
(45) Date of Patent: Jul. 17, 2018

(54) ALIGNMENT FILM MATERIAL AND METHOD FOR PRODUCING ALIGNMENT FILM

(71) Applicant: Shenzhen China Star Optoelectronics Technology Co., Ltd., Shenzhen (CN)

(72) Inventors: Yongchao Zhao, Shenzhen (CN); Chungching Hsieh, Shenzhen (CN); Yanjun Song, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 273 days.

(21) Appl. No.: 14/895,661

(22) PCT Filed: Nov. 17, 2015

(86) PCT No.: PCT/CN2015/094808
§ 371 (c)(1),
(2) Date: Dec. 3, 2015

(87) PCT Pub. No.: WO2017/063248
PCT Pub. Date: Apr. 20, 2017

(65) Prior Publication Data
US 2017/0190974 A1    Jul. 6, 2017

(30) Foreign Application Priority Data
Oct. 12, 2015  (CN) .......................... 2015 1 0655801

(51) Int. Cl.
C09K 19/54   (2006.01)
G02F 1/1337  (2006.01)

(52) U.S. Cl.
CPC .......... *C09K 19/542* (2013.01); *G02F 1/1337* (2013.01); *G02F 1/133711* (2013.01); *G02F 1/133723* (2013.01); *Y10T 428/1005* (2015.01); *Y10T 428/1023* (2015.01)

(58) Field of Classification Search
CPC ............................. C09K 19/542; C09K 19/56; C09K 2019/546; C09K 2019/548; G02F 1/1337; G02F 1/133711; G02F 1/133723; Y10T 428/1005; Y10T 428/1023
USPC ............... 428/1.2, 1.25, 1.26; 349/123, 129; 427/58; 558/411
See application file for complete search history.

(56) References Cited

U.S. PATENT DOCUMENTS 5,159,054 A   10/1992   Keller
5,571,891 A   11/1996   Jung
(Continued)

FOREIGN PATENT DOCUMENTS

| CN | 101359128 A | 2/2009 |
| CN | 102863448 A | 1/2013 |
| CN | 103119509 A | 5/2013 |

(Continued)

*Primary Examiner* — Ruiyun Zhang
(74) *Attorney, Agent, or Firm* — JMB Davis Ben-David

(57) ABSTRACT

An alignment film material and a method of producing an alignment film are described. The alignment film material has polyimide and crosslinked polymer. The crosslinked polymer is formed from a first component through a crosslinking reaction. A crosslink density of the alignment film can be enhanced without additionally adding a catalyst, so as to increase a hardness of the alignment film.

18 Claims, 1 Drawing Sheet

(56) References Cited

U.S. PATENT DOCUMENTS

2009/0033854 A1    2/2009  Shen
2011/0164213 A1*   7/2011  Nakanishi .............. C08L 79/08
                                                        349/129

FOREIGN PATENT DOCUMENTS

CN         103922989 A      7/2014
EP           0678539 A2    10/1995

* cited by examiner

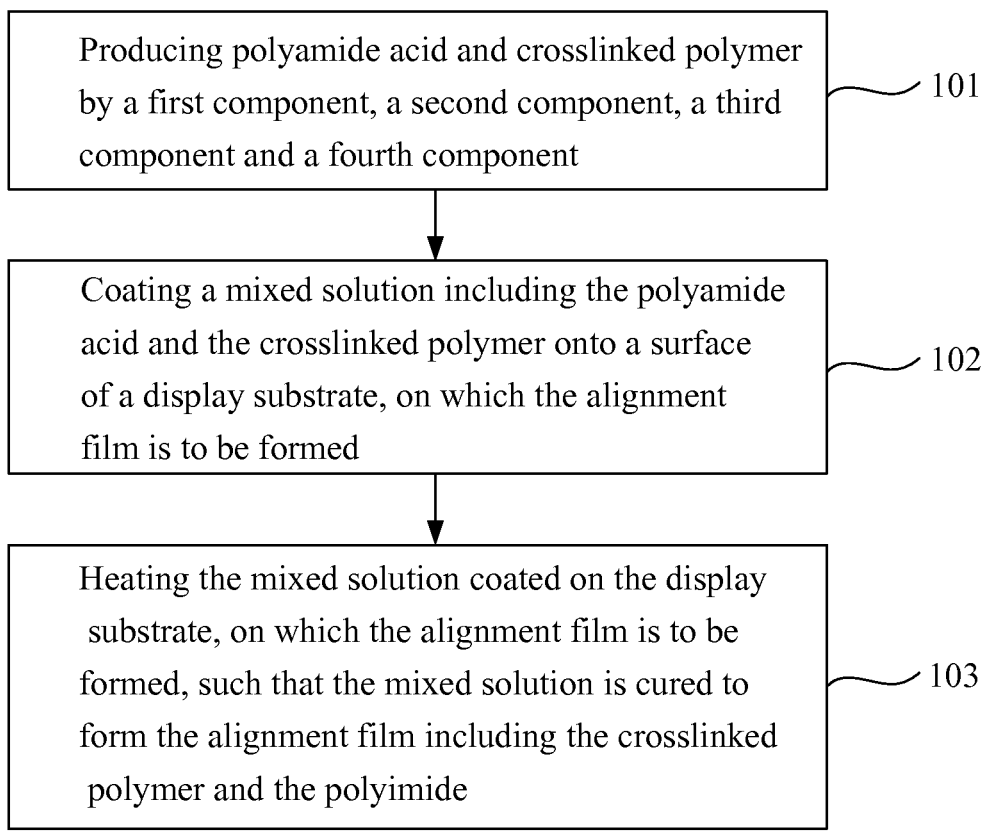

ALIGNMENT FILM MATERIAL AND METHOD FOR PRODUCING ALIGNMENT FILM

CROSS-REFERENCE TO RELATED APPLICATIONS

This is the U.S. National Stage of International Application No. PCT/CN2015/094808, filed Nov. 17, 2015, which in turn claims the benefit of China Patent Application No. 201510655801.6, filed Oct. 12, 2015.

FIELD OF THE INVENTION

The present invention relates to a display technical field, and more particularly to an alignment film material.

BACKGROUND OF THE INVENTION

In a thin film transistor liquid crystal display (TFT-LCD), an alignment film is a very important component. With development of technologies, the thin film transistor liquid crystal display has an increasingly demanding on a hardness of the alignment film. The requirement is specifically reflected in: reducing the effects of touching, pressing and other operations of the TFTLCD on alignment.

In order to improve the hardness of the alignment film, a traditional technical solution generally: add some crosslinking agent or a combination of the crosslinking agent and a catalyst into an alignment film material, so as to increase a crosslink density of the alignment film.

The crosslinking agent or the catalyst are both small molecular substances. In a thermal curing process, the crosslinking agent or the catalyst are easily volatilized, thereby causing the produced alignment film to form defects and being hard to increase the hardness of the alignment film effectively.

As a result, it is necessary to provide a new technical solution to solve the problems described above.

SUMMARY OF THE INVENTION

A primary object of the present invention is to provide an alignment film material and a method for producing an alignment film, which can increase a crosslink density and a hardness of the alignment film effectively.

In order to solve the above problems, the technical solution of the present invention is provided as follows:

An alignment film material is provided and, comprises: polyimide; and crosslinked polymer formed from a first component through a crosslinking reaction; wherein the first component is one of phthalonitrile-containing diamine monomer, phthalonitrile-containing dianhydride monomer and phthalonitrile chemical; wherein the crosslinked polymer is formed by catalyzing phthalonitrile groups or the phthalonitrile chemical of the first component by a second component so as to cause the crosslinking reaction; or wherein the polyimide is formed by forming polyamide acid from a third component and a fourth component, and then thermally curing the polyamide acid to undergo a ring-closure reaction, wherein the third component is one of diamine monomer, phthalonitrile-containing diamine monomer and benzimidazole-containing diamine monomer; and the fourth component is one of dianhydride monomer, phthalonitrile-containing dianhydride monomer and benzimidazole-containing dianhydride monomer.

In the alignment film material described above, the second component is used to catalyze the phthalonitrile groups or the phthalonitrile chemical of the first component, so as to form the crosslinked polymer.

In the alignment film material described above, the second component is one of benzimidazole-containing diamine monomer, benzimidazole-containing dianhydride monomer and benzimidazole chemical.

In the alignment film material described above, the crosslinked polymer includes at least one of soindoline, triazine, dehydrophthalocyanine and phthalocyanine.

In the alignment film material described above, the soindoline, the triazine, the dehydrophthalocyanine and the phthalocyanine are all formed by being catalyzed by the second component during the polyamide acid is thermally cured to form the polyimide by the first component.

In the alignment film material described above, the crosslinked polymer is used to increase a crosslink density of an alignment film corresponding to the alignment film material, so as to raise a hardness of the alignment film.

An alignment film material is provided and, comprises: polyimide; and crosslinked polymer formed from a first component through a crosslinking reaction.

In the alignment film material described above, the first component is one of phthalonitrile-containing diamine monomer, phthalonitrile-containing dianhydride monomer and phthalonitrile chemical.

In the alignment film material described above, the crosslinked polymer is formed by catalyzing phthalonitrile groups or the phthalonitrile chemical of the first component by a second component so as to cause the crosslinking reaction.

In the alignment film material described above, the second component is used to catalyze the phthalonitrile groups or the phthalonitrile chemical of the first component, so as to form the crosslinked polymer.

In the alignment film material described above, the second component is one of benzimidazole-containing diamine monomer, benzimidazole-containing dianhydride monomer and benzimidazole chemical.

In the alignment film material described above, the crosslinked polymer includes at least one of soindoline, triazine, dehydrophthalocyanine and phthalocyanine.

In the alignment film material described above, the soindoline, the triazine, the dehydrophthalocyanine and the phthalocyanine are all formed by being catalyzed by the second component during polyamide acid is thermally cured to form the polyimide by the first component.

In the alignment film material described above, the crosslinked polymer is used to increase a crosslink density of an alignment film corresponding to the alignment film material, so as to raise a hardness of the alignment film.

In the alignment film material described above, the polyimide is formed from a third component and a fourth component, wherein the third component is one of diamine monomer, phthalonitrile-containing diamine monomer and benzimidazole-containing diamine monomer; and the fourth component is one of dianhydride monomer, phthalonitrile-containing dianhydride monomer and benzimidazole-containing dianhydride monomer.

In the alignment film material described above, the polyimide is formed by forming polyamide acid from the third component and the fourth component, and then thermally curing the polyamide acid to undergo a ring-closure reaction.

A method of producing an alignment film is provided and, comprises steps of: producing polyamide acid and crosslinked polymer by a first component, a second component, a third component and a fourth component, wherein the first component is one of phthalonitrile-containing diamine monomer, phthalonitrile-containing dianhydride monomer and phthalonitrile chemical; the second component is one of benzimidazole-containing diamine monomer, benzimidazole-containing dianhydride monomer and benzimidazole chemical; the third component includes one of diamine monomer, phthalonitrile-containing diamine monomer and benzimidazole-containing diamine monomer; and the fourth component includes one of dianhydride monomer, phthalonitrile-containing dianhydride monomer and benzimidazole-containing dianhydride monomer; coating a mixed solution including the polyamide acid and the crosslinked polymer onto a surface of a display substrate, on which the alignment film is to be formed; and heating the mixed solution coated on the display substrate, on which the alignment film is to be formed, such that the mixed solution is cured to form the alignment film including the crosslinked polymer and the polyimide.

In the method of alignment film described above, the crosslinked polymer is formed by catalyzing phthalonitrile groups or the phthalonitrile chemical of the first component by the second component so as to cause a crosslinking reaction.

In the method of alignment film described above, the polyimide is formed by forming the polyamide acid from the third component and the fourth component, and then thermally curing the polyamide acid to undergo a ring-closure reaction.

In comparison with the prior art, the present invention, a crosslink density of the alignment film can be enhanced without additionally adding a catalyst, so as to increase a hardness of the alignment film.

To make the above description of the present invention can be more clearly comprehensible, description below in examples of preferred embodiments with the accompanying drawings, described in detail below.

DESCRIPTION OF THE DRAWINGS

FIG. 1 is a flow chart of a method for producing an alignment film of the present invention.

DETAILED DESCRIPTION OF THE PREFERRED EMBODIMENTS

As used in this specification, the term "embodiment" means that an instance, an example or illustration. In addition, the articles in this specification and the appended claims, use of "a", in general can be interpreted as "one or more than one" unless specified otherwise or being clear from context to determine the singular form.

A first embodiment of an alignment film material of the present invention includes polyimide and crosslinked polymer. The crosslinked polymer is formed from a first component through a crosslinking reaction;

wherein the first component is one of phthalonitrile-containing (groups) diamine monomer, phthalonitrile-containing (groups) dianhydride monomer and phthalonitrile chemical. A structural formula of the phthalonitrile-containing diamine monomer is shown as formula (1);

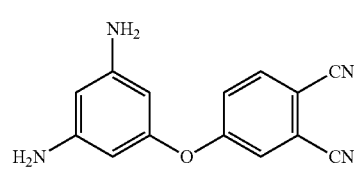

Formula (1)

wherein the crosslinked polymer may be such as any one of isoindoline, triazine, dehydrophthalocyanine and phthalocyanine. The soindoline, the triazine, the dehydrophthalocyanine and the phthalocyanine are all formed by being catalyzed by the second component during the polyamide acid is thermally cured to form the polyimide by the first component.

A structural formula of the isoindoline is shown as formula (2).

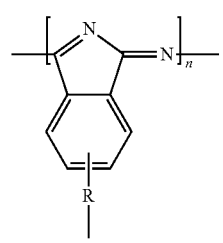

Formula (2)

A structural formula of the triazine is shown as formula (3).

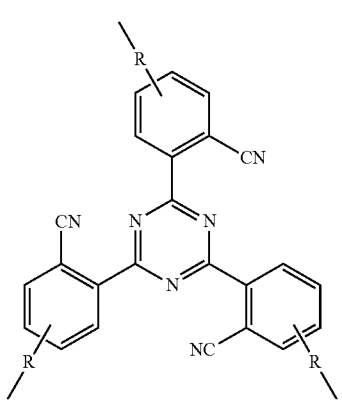

Formula (3)

A structural formula of the dehydrophthalocyanine is shown as formula (4).

Formula (4)

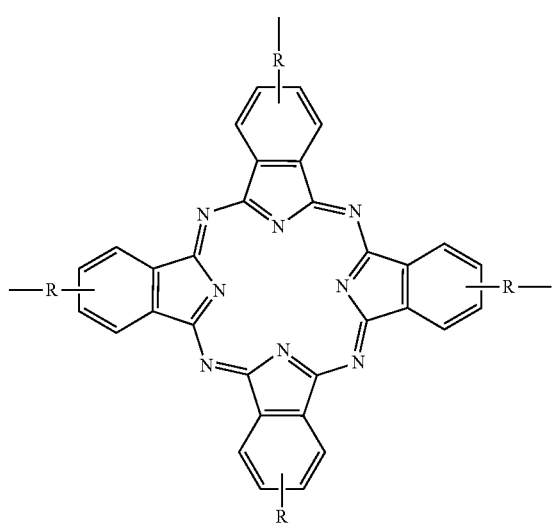

A structural formula of the phthalocyanine is shown as formula (5).

Formula (5)

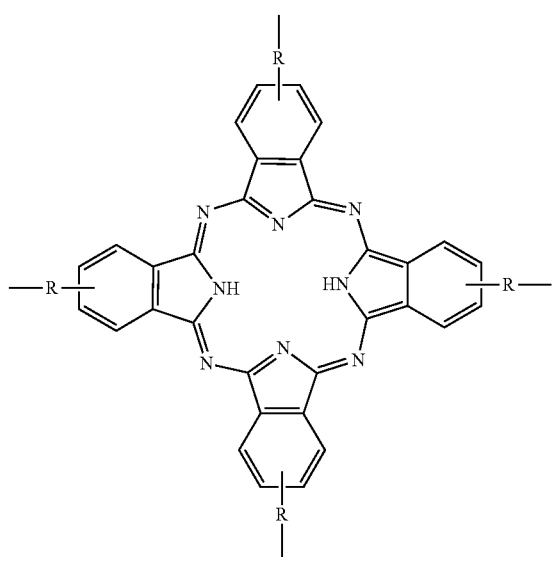

In the present embodiment, the crosslinked polymer is used to increase a crosslink density of an alignment film corresponding to the alignment film material, so as to raise a hardness of the alignment film.

A second embodiment of the alignment film material of the present invention is similar to the above first embodiment, and the difference therebetween is that:

In the present embodiment, the crosslinked polymer is formed by catalyzing phthalonitrile groups or the phthalonitrile chemical of the first component by a second component so as to cause the crosslinking reaction;

wherein the second component is one of benzimidazole-containing (groups) diamine monomer, benzimidazole-containing (groups) dianhydride monomer and benzimidazole chemical, the second component is used to catalyze the phthalonitrile groups or the phthalonitrile chemical of the first component, so as to form the crosslinked polymer. A structural formula of the benzimidazole-containing dianhydride monomer is shown as formula (6).

Formula (6)

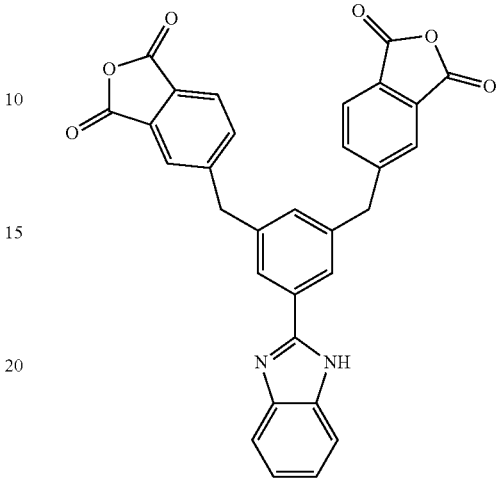

In the above first embodiment and second embodiment, the polyimide is formed from (consist of) a third component and a fourth component, wherein the third component is one of diamine monomer, phthalonitrile-containing diamine monomer and benzimidazole-containing diamine monomer; and the fourth component is one of dianhydride monomer, phthalonitrile-containing dianhydride monomer and benzimidazole-containing dianhydride monomer;

wherein the polyimide is formed by forming polyamide acid from the third component and the fourth component, and then the polyamide acid is thermally cured to undergo a ring-closure reaction.

For example, the polyimide is formed from the diamine monomer and the ianhydride monomer; or, the polyimide is formed from the diamine monomer and the phthalonitrile-containing dianhydride monomer; or the polyimide is formed from the diamine monomer and the benzimidazole-containing dianhydride monomer; or, the polyimide is formed from the phthalonitrile-containing diamine monomer and the ianhydride monomer; or, the polyimide is formed from the phthalonitrile-containing diamine monomer and the phthalonitrile-containing dianhydride monomer; or the polyimide is formed from the phthalonitrile-containing diamine monomer and the benzimidazole-containing dianhydride monomer; or, the polyimide is formed from the benzimidazole-containing diamine monomer and the dianhydride monomer; or, the polyimide is formed from the benzimidazole-containing diamine monomer and the phthalonitrile-containing dianhydride monomer; or, the polyimide is formed from the benzimidazole-containing diamine monomer and the benzimidazole-containing dianhydride monomer.

In the above technical solution, a crosslink density of the alignment film can be enhanced without additionally adding a catalyst, so as to increase a hardness of the alignment film.

Referring to FIG. 1, FIG. 1 is a flow chart of a method for producing an alignment film of the present invention.

The method for producing the alignment film of the present embodiment includes steps of:

Producing polyamide acid and crosslinked polymer by a first component, a second component, a third component and a fourth component, wherein the first component is one of phthalonitrile-containing diamine monomer, phthalonitrile-containing dianhydride monomer and phthalonitrile chemical; the second component is one of benzimidazole-containing diamine monomer, benzimidazole-containing dianhydride monomer and benzimidazole chemical; the third component includes one of diamine monomer, phthalonitrile-containing diamine monomer and benzimidazole-containing diamine monomer; and the fourth component includes one of dianhydride monomer, phthalonitrile-containing dianhydride monomer and benzimidazole-containing dianhydride monomer;

Coating a mixed solution including the polyamide acid and the crosslinked polymer onto a surface of a display substrate, on which the alignment film is to be formed; wherein the display substrate, on which the alignment film is to be formed, can be such as a thin film transistor (TFT) array substrate or a color filter (CF) substrate; and Heating the mixed solution coated on the display substrate, on which the alignment film is to be formed, such that the mixed solution is cured to form the alignment film including the crosslinked polymer and the polyimide.

In the present embodiment, the crosslinked polymer is formed by catalyzing phthalonitrile groups or the phthalonitrile chemical of the first component by the second component so as to cause a crosslinking reaction.

The polyimide is formed by forming the polyamide acid from the third component and the fourth component, and then the polyamide acid is thermally cured to undergo a ring-closure reaction.

Example 1: the first component is the phthalonitrile-containing diamine monomer; the second component is the benzimidazole-containing diamine monomer; the third component is the diamine monomer; and the fourth component is the dianhydride monomer.

Example 2: the first component is the phthalonitrile-containing dianhydride monomer; the second component is the benzimidazole-containing diamine monomer; the third component is the diamine monomer; and the fourth component is the dianhydride monomer.

Example 3: the first component is the phthalonitrile chemical; the second component is the benzimidazole chemical; the third component is the diamine monomer; and the fourth component is the dianhydride monomer.

Example 4: the first component and the third component are both phthalonitrile-containing dianhydride monomer; and the second component and the fourth component are both benzimidazole-containing diamine monomer.

Example 5: the first component and the third component are both phthalonitrile-containing diamine monomer; and the second component and the fourth component are both benzimidazole-containing dianhydride monomer.

And so on.

The above technical solution can cause the produced alignment film to have a relatively high crosslink density, which means that it has a sufficient hardness without additionally adding a catalyst.

Although the present invention has been shown and described relative to one or more implementations, those skilled in the art will expect the equivalent variations and modifications based on reading and understanding the present specification and appended figures. The present invention includes all of the modifications and variations, and is only limited to the scope of the appended claims. Further, although specific features of the present specification has been disclosed with respect to only one of several implementations, such features may be combined with, such as one or more other features of other implementations which may be expected or advantageous for given or particular applications. Furthermore, the terms "include", "have", "composed of" or other variants as used in the embodiments or claims intends to means inclusion in the same manner as the term "include".

As described above, although the present invention has been described in a preferred embodiment described above, preferred embodiments described above are not intended to limit the invention, one of ordinary skill in the art without departing from the spirit and scope of the invention within, can make various modifications and variations, so the range of the scope of the invention defined by the claims prevail.

What is claimed is:

1. An alignment film material, comprising:
a polyimide; and
a crosslinked polymer formed from a first component through a crosslinking reaction;
wherein the first component is a phthalonitrile-containing diamine monomer;
wherein the crosslinked polymer is formed by catalyzing the first component by a second component so as to cause the crosslinking reaction, and the crosslinked polymer has a structure unit formed from the phthalonitrile-containing diamine monomer with the second component; and
wherein the polyimide is formed by forming a polyamide acid from a third component and a fourth component, and then thermally curing the polyamide acid to undergo a ring-closure reaction, wherein the third component is a phthalonitrile-containing diamine monomer; and the fourth component is a benzimidazole-containing dianhydride monomer.

2. The alignment film material according to claim 1, wherein the second component is used to catalyze the first component, so as to form the crosslinked polymer.

3. The alignment film material according to claim 2, wherein the second component is a benzimidazole-containing dianhydride monomer.

4. The alignment film material according to claim 1, wherein the crosslinked polymer includes at least one structure unit of a soindoline, a triazine, a dehydrophthalocyanine and a phthalocyanine.

5. The alignment film material according to claim 4, wherein the soindoline, the triazine, the dehydrophthalocyanine or the phthalocyanine is formed by being catalyzed by the second component during the polyamide acid is thermally cured to form the polyimide by the first component.

6. The alignment film material according to claim 1, wherein the crosslinked polymer is used to increase a crosslink density of an alignment film corresponding to the alignment film material, so as to raise a hardness of the alignment film.

7. An alignment film material, comprising:
a polyimide; and
a crosslinked polymer formed from a first component through a crosslinking reaction;
wherein the first component is a phthalonitrile-containing diamine monomer; and
wherein the crosslinked polymer has a structure unit formed from the phthalonitrile-containing diamine monomer with a second component.

8. The alignment film material according to claim 7, wherein the crosslinked polymer is formed by catalyzing the first component by the second component so as to cause the crosslinking reaction.

9. The alignment film material according to claim 8, wherein the second component is used to catalyze the first component, so as to form the crosslinked polymer.

10. The alignment film material according to claim 9, wherein the second component is a benzimidazole-containing dianhydride monomer.

11. The alignment film material according to claim 8, wherein the crosslinked polymer includes at least one structure unit of a soindoline, a triazine, a dehydrophthalocyanine and a phthalocyanine.

12. The alignment film material according to claim 11, wherein the soindoline, the triazine, the dehydrophthalocyanine or the phthalocyanine is formed by being catalyzed by the second component during polyamide acid is thermally cured to form the polyimide by the first component.

13. The alignment film material according to claim 7, wherein the crosslinked polymer is used to increase a crosslink density of an alignment film corresponding to the alignment film material, so as to raise a hardness of the alignment film.

14. The alignment film material according to claim 7, wherein the polyimide is formed from a third component and a fourth component, wherein the third component is a phthalonitrile-containing diamine monomer; and the fourth component is a benzimidazole-containing dianhydride monomer.

15. The alignment film material according to claim 14, wherein the polyimide is formed by forming a polyamide acid from the third component and the fourth component, and then thermally curing the polyamide acid to undergo a ring-closure reaction.

16. A method of producing an alignment film, comprising steps of:

producing a polyamide acid and a crosslinked polymer by a first component, a second component, a third component and a fourth component, wherein the first component is a phthalonitrile-containing diamine monomer; the second component is a benzimidazole-containing dianhydride monomer; the third component includes a phthalonitrile-containing diamine monomer; and the fourth component includes a benzimidazole-containing dianhydride monomer;

coating a mixed solution including the polyamide acid and the crosslinked polymer onto a surface of a display substrate, on which the alignment film is to be formed; and heating the mixed solution coated on the display substrate, on which the alignment film is to be formed, such that the mixed solution is cured to form the alignment film including the crosslinked polymer and the polyimide.

17. The method of producing the alignment film according to claim 16, wherein the crosslinked polymer is formed by catalyzing the first component by the second component so as to cause a crosslinking reaction.

18. The method of producing the alignment film according to claim 16, wherein the polyimide is formed by forming the polyamide acid from the third component and the fourth component, and then thermally curing the polyamide acid to undergo a ring-closure reaction.

* * * * *